US 12,539,611 B2

(12) United States Patent
Fujisawa

(10) Patent No.: US 12,539,611 B2
(45) Date of Patent: Feb. 3, 2026

(54) ROBOT CONTROL APPARATUS, ROBOT CONTROL SYSTEM, AND ROBOT CONTROL METHOD

(71) Applicant: NACHI-FUJIKOSHI CORP., Tokyo (JP)

(72) Inventor: Tatsuro Fujisawa, Toyama (JP)

(73) Assignee: NACHI-FUJIKOSHI CORP., Tokyo (JP)

(*) Notice: Subject to any disclaimer, the term of this patent is extended or adjusted under 35 U.S.C. 154(b) by 270 days.

(21) Appl. No.: 18/187,892

(22) Filed: Mar. 22, 2023

(65) Prior Publication Data
US 2023/0302647 A1   Sep. 28, 2023

(30) Foreign Application Priority Data
Mar. 23, 2022 (JP) ................ 2022-046686

(51) Int. Cl.
B25J 9/16 (2006.01)
B25J 9/00 (2006.01)
(52) U.S. Cl.
CPC .......... B25J 9/1674 (2013.01); B25J 9/0093 (2013.01); B65G 2811/095 (2013.01)
(58) Field of Classification Search
None
See application file for complete search history.

(56) References Cited

U.S. PATENT DOCUMENTS

2011/0264266 A1   10/2011 Kock
2018/0043527 A1*  2/2018 Koga .................. G05B 19/19
2018/0333849 A1* 11/2018 Sugio ................. B25J 9/0093
2019/0070730 A1*  3/2019 Morioka .............. B25J 9/1666
2019/0283253 A1*  9/2019 Naitou ................ B25J 13/081

FOREIGN PATENT DOCUMENTS

| JP | 2000-289852 A | 10/2000 |
| JP | 2013-000854 A | 1/2013 |
| JP | 2016-169086 A | 9/2016 |
| JP | 2018027575 A | 2/2018 |
| JP | 6496353 B2 | 4/2019 |
| JP | 2020-082227 A | 6/2020 |

OTHER PUBLICATIONS

European Search Report issued on Aug. 1, 2023, in corresponding European Application No. 23163335, 13 pages.
Office Action issued on Mar. 6, 2025, in corresponding European Application No. 23 163 335.5, 8 pages.
Office Action issued on Nov. 18, 2025, in corresponding Japanese Application No. 2022-046686, 8 pages.

* cited by examiner

Primary Examiner — Adam R Mott
Assistant Examiner — Alan Lindsay Ostrow
(74) Attorney, Agent, or Firm — Maier & Maier, PLLC

(57) ABSTRACT

A robot control apparatus includes: a speed setter configured to control a collaborative robot that processes a workpiece flowing on a conveyor according to whether a human is or is not detected from a detection result from a detection device that detects a human present within a certain range from the collaborative robot, and sets an upper limit value on the operating speed of the conveyor such that the value is different depending on the detection result from the detection device; and a conveyor controller configured to control the operating speed of the conveyor to be an operating speed less than or equal to the upper limit value set by the speed setter.

13 Claims, 6 Drawing Sheets

ROBOT CONTROL APPARATUS, ROBOT CONTROL SYSTEM, AND ROBOT CONTROL METHOD

CROSS-REFERENCE TO RELATED APPLICATION

This application is based upon and claims the benefit of priority from Japanese Patent Application No. 2022-046686 filed on Mar. 23, 2022, the contents all of which are incorporated herein by reference.

FIELD

The present invention relates to a robot control apparatus, a robot control system, and a robot control method that control operations of a collaborative robot that processes a workpiece flowing on a conveyor, the control being performed according to a detection result from a detection device that detects a human present within a certain range from the collaborative robot.

BACKGROUND

In the related art, a robot control apparatus is known in which operations of a collaborative robot, which performs processing work such as gripping a workpiece flowing on a conveyor in a space where humans may be present, are controlled such that the operating speed of the collaborative robot keeps up with the operating speed of the conveyor.

In this regard, Japanese Patent No. 6496353 discloses a configuration for controlling the operating speed of a collaborative robot according to the operating speed of the conveyor and whether the state of the collaborative robot is a collaborative state, that is, a state in which a human is present in the space where the collaborative robot is disposed, or a non-collaborative state, that is, a state in which a human is not present in the space where the collaborative robot is disposed.

SUMMARY

However, with the technology described in Japanese Patent No. 6496353, when the collaborative robot is in the collaborative state, to ensure worker safety, it is necessary to lower the operating speed of the collaborative robot compared to when the collaborative robot is in the non-collaborative state, that is, the state in which a human is not present in the space where the collaborative robot is disposed. Consequently, if the operating speed of the collaborative robot is lowered due to the collaborative robot being in the collaborative state and is thereby unable to keep up with the operating speed of the conveyor, or in other words, if the operating speed of the conveyor is faster than the operating speed of the collaborative robot, it is necessary to lower the operating speed of the conveyor to match the collaborative robot, which may lead to problems such as lowered work efficiency.

The present invention has been created in light of such problems, and the purpose thereof is to provide a robot control apparatus, a robot control system, and a robot control method that can lessen a lowering in the work efficiency of a collaborative robot that processes a workpiece flowing on a conveyor.

To address the above problem, a robot control apparatus of the present invention is a robot control apparatus that controls operations of a collaborative robot that processes a workpiece flowing on a conveyor, the control being performed according to a detection result from a detection device that detects a human present within a certain range from the collaborative robot, the robot control apparatus being provided with: a speed setter configuring to set an upper limit value on an operating speed of the conveyor such that the value is different depending on whether a human is or is not detected from the detection result from the detection device; and a conveyor controller configuring to control the operating speed of the conveyor to be an operating speed less than or equal to the upper limit value set by the speed setter.

Also, if the detection result from the detection device indicates that a human is present within the certain range from the collaborative robot, the speed setter is configuring to set the upper limit value to a first speed, and if the detection result from the detection device indicates that a human is not present within the certain range from the collaborative robot, the speed setter is configuring to set the upper limit value to a second speed that is faster than the first speed.

Also, a conveyor speed detector configuring to detect the operating speed of the conveyor and a robot controller configuring to set an operating speed of the collaborative robot according to the detection result from the detection device and a detection result from the conveyor speed detector are further provided.

Also, a speed calculator configuring to calculate an operating speed of the collaborative robot according to the operating speed of the conveyor controlled by the conveyor controller and operation content of the collaborative robot stored in advance, and if the calculated operating speed of the collaborative robot exceeds the upper limit value, calculates the operating speed of the conveyor so that the operating speed of the collaborative robot is the upper limit value on the operating speed of the collaborative robot, and a robot controller configuring to set the operating speed of the collaborative robot to the operating speed of the collaborative robot calculated by the speed calculator are further provided, the speed setter is configuring to set an upper limit value on the operating speed of the collaborative robot according to whether a human is or is not detected from the detection result, and sets the operating speed of the conveyor calculated by the speed calculator as the upper limit value on the operating speed of the conveyor.

Also, a robot control system of the present invention is provided with: a conveyor; a collaborative robot that processes a workpiece flowing on the conveyor; a detection device that detects a human present within a certain range from the collaborative robot; and a robot control apparatus including a speed setter configuring to set an upper limit value on an operating speed of the conveyor such that the value is different depending on whether a human is or is not detected from a detection result from the detection device, a conveyor controller configuring to control the operating speed of the conveyor to be an operating speed less than or equal to the upper limit value set by the speed setter, and a robot controller configuring to set an operating speed of the collaborative robot according to the detection result from the detection device.

Also, the robot control apparatus is a plurality and at least one of the robot control apparatus is provided with a mode setter configuring to set a control mode to either a first mode or a second mode, and if the control mode is the first mode, the conveyor controller is configuring to control operations of the conveyor so that the operating speed is up to the upper limit value which is the smaller value of either the upper limit value set by the speed setter or a transmitted upper limit value set in another robot control apparatus which is in the second mode in terms of the control mode, whereas if the control mode is the second mode, the conveyor controller is configuring to stop control of the conveyor and transmits the upper limit value set by the speed setter to another robot control apparatus.

Also, a robot control method of the present invention is a robot control method for controlling operations of a collaborative robot that processes work on a workpiece flowing on a conveyor, the control being performed according to a detection result from a detection device that detects a human present within a certain range from the collaborative robot, the robot control method including: setting an upper limit value on an operating speed of the conveyor such that the value is different depending on whether a human is or is not detected from the detection result from the detection device; controlling operations of the conveyor at an operating speed up to the set upper limit value; setting an operating speed of the collaborative robot according to the detection result from the detection device; and controlling operations of the collaborative robot so that the set operating speed is reached.

According to the present invention, a robot control apparatus, a robot control system, and a robot control method can lessen a lowering in the work efficiency of a collaborative robot that processes a workpiece flowing on a conveyor.

The above and other objects, features, and advantages of the present invention will become more apparent from the following description when taken in conjunction with the accompanying drawings in which a preferred embodiment of the present invention is shown by way of illustrative example.

DETAILED DESCRIPTION

Hereinafter, embodiments of the present invention (hereinafter referred to as the "present embodiment(s)") will be described with reference to the drawings. To facilitate understanding, like elements and steps in each of the drawings are denoted with like signs wherever possible, and a duplicate description is omitted.

First Embodiment

First, a first embodiment will be described.
<Configuration>

Figure 1:
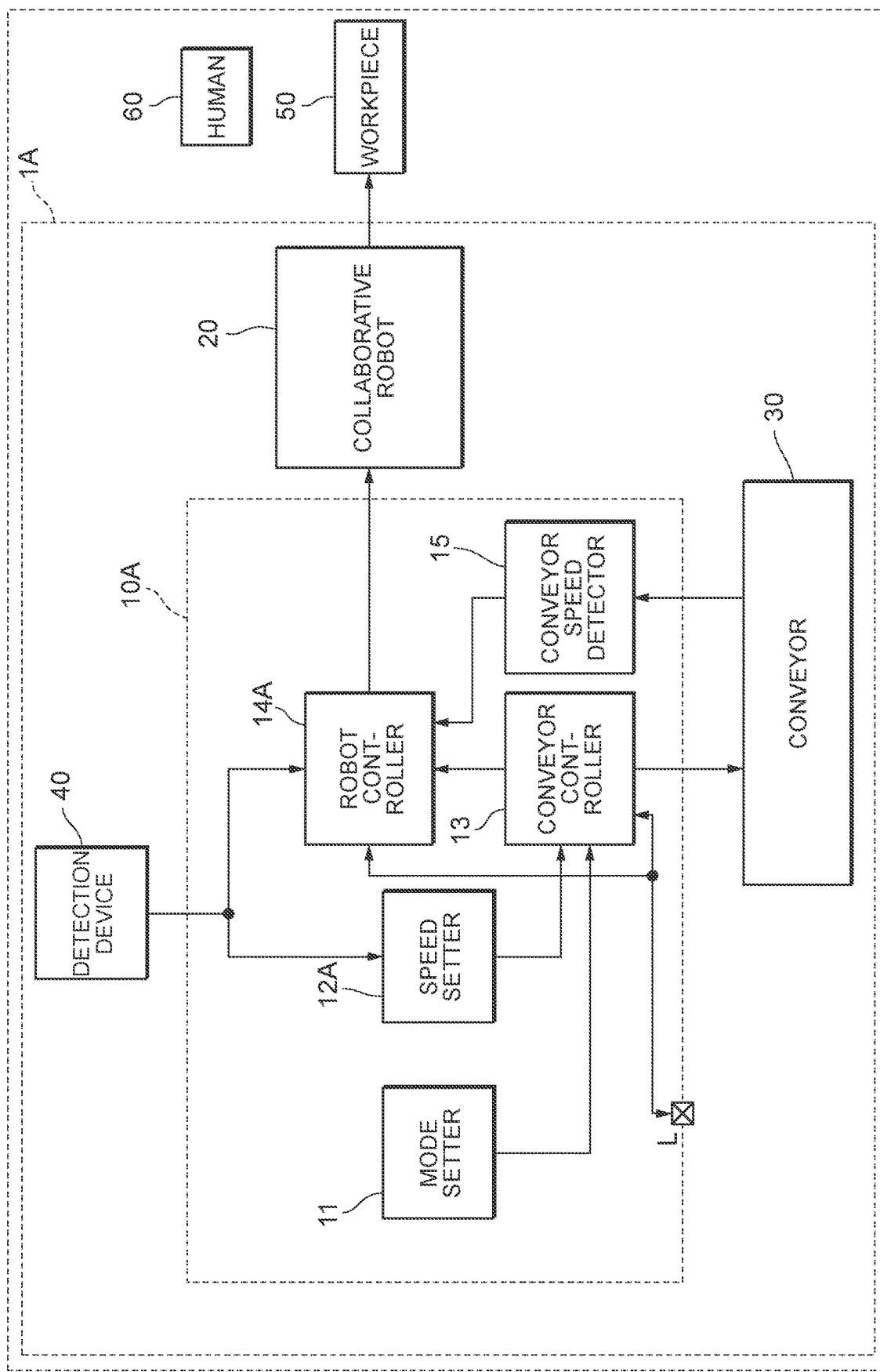
FIG. 1 is a diagram illustrating a configuration of a robot control system according to a first embodiment.

FIG. 1 is a diagram illustrating a configuration of a robot control system 1A according to a first embodiment. As illustrated in FIG. 1, the robot control system 1A is configuring to mainly include a robot control apparatus 10A, a collaborative robot 20, a conveyor 30, and a detection device 40.

The collaborative robot 20 is a robot that performs prescribed processing work, such as gripping a workpiece 50 flowing on the conveyor 30, in accordance with control by the robot control apparatus 10A, and is disposed in a space where a human 60 may be present to perform work involving the workpiece 50 and the conveyor 30 or other work. Also, as is well known, the collaborative robot 20 operates while ensuring a certain level of safety for the human 60 present in the same space, without enclosing the collaborative robot 20 with a safety fence or the like.

The conveyor 30 is a conveyor device that conveys the workpiece 50 on a prescribed route. The conveyor 30 operates to convey the workpiece 50 at an operating speed according to input from a conveyor controller 13 of the robot control apparatus 10A or an operator of the conveyor 30. The conveyor 30 also outputs information related to the operating speed to a conveyor speed detector 15 of the robot control apparatus 10A.

The detection device 40 is a sensor which is disposed near the collaborative robot 20 and which detects the human 60 who comes within a certain range from the collaborative robot 20. On one hand, in the case of detecting that the human 60 has come within a certain range from the collaborative robot 20, the detection device 40 outputs a detection result indicating a collaborative state to a speed setter 12A and a robot controller 14A of the robot control apparatus 10A. On the other hand, in the case in which the human 60 is not detected within a certain range from the collaborative robot 20 (the non-detection case), the detection device 40 outputs a detection result indicating a non-collaborative state to the speed setter 12A and the robot controller 14A of the robot control apparatus 10A.

The workpiece 50 is conveyed by the conveyor 30 and subjected to prescribed work by the collaborative robot 20. The workpiece 50 may also be subjected to further work performed by the human 60 in addition to the work by the collaborative robot 20.

The robot control apparatus 10A is a device that controls overall operations of the collaborative robot 20, and in addition, the robot control apparatus 10A controls the operating speeds of the collaborative robot 20 and the conveyor 30 according to either a detection result outputted from the detection device 40 and related to whether the human 60 is within a certain range from the collaborative robot 20, or the operating speed of the conveyor 30 outputted from the conveyor 30. Also, the robot control apparatus 10A has two operating modes: a primary mode and a secondary mode. In the first embodiment, the robot control apparatus 10A operates only in the primary mode. Operations of the robot control apparatus 10A, including the secondary mode, will be described later, and thus a description is omitted here. The robot control apparatus 10A is configuring to mainly include a mode setter 11, a speed setter 12A, a conveyor controller 13, a robot controller 14A, and a conveyor speed detector 15, for example.

The mode setter 11 sets the control mode of the robot control apparatus 10A to either the primary mode (first mode) or the secondary mode (second mode) according to input provided by the operator of the robot control apparatus 10A or the like, and relays the set control mode to the conveyor controller 13 and the robot controller 14A.

The speed setter 12A sets an upper limit value on the operating speed of the conveyor 30 such that the value is different depending on the detection result outputted from the detection device 40, and relays the set upper limit value on the operating speed of the conveyor 30 to the conveyor controller 13. Specifically, on one hand, if the detection result from the detection device 40 indicates the collaborative state, the speed setter 12A sets the upper limit value on the operating speed of the conveyor 30 to a first speed. On the other hand, if the detection result from the detection device 40 indicates the non-collaborative state, the speed setter 12A sets the upper limit value on the operating speed of the conveyor 30 to a second speed that is a faster value than the first speed. Thereafter, the speed setter 12A relays the set upper limit value on the operating speed of the conveyor 30 to the conveyor controller 13.

The conveyor controller 13 sets the operating speed of the conveyor 30 to be an operating speed less than or equal to the upper limit value on the operating speed of the conveyor 30 relayed from the speed setter 12A. The conveyor controller 13 controls operations of the conveyor 30 so that the set operating speed is reached.

If the detection result from the detection device 40 indicates the collaborative state, the robot controller 14A sets the operating speed of the collaborative robot 20 to a speed α, for example. Also, if the detection result from the detection device 40 indicates the non-collaborative state, the robot controller 14A sets the operating speed of the collaborative robot 20 to a speed β that is a faster value than the speed α, for example. The robot controller 14A also calculates and sets an operating speed for the collaborative robot 20 that can keep up, in accordance with the operating speed of the conveyor 30 detected by the conveyor speed detector 15 and the operating speed of the conveyor 30 set by the conveyor controller 13. Additionally, the robot controller 14A controls the operating speed of the collaborative robot 20 so that the set operating speed is reached. Note that every time there is a variation in the outputs from the detection device 40, the conveyor controller 13, and the conveyor speed detector 15, the robot controller 14A re-sets the operating speed of the collaborative robot 20 according to the information indicated by the outputs that have varied.

The conveyor speed detector 15 detects information related to the operating speed of the conveyor 30 from the conveyor 30, and relays the detected information related to the operating speed of the conveyor 30 to the robot controller 14A.

<Flow of Processing Sequence>

Figure 2:
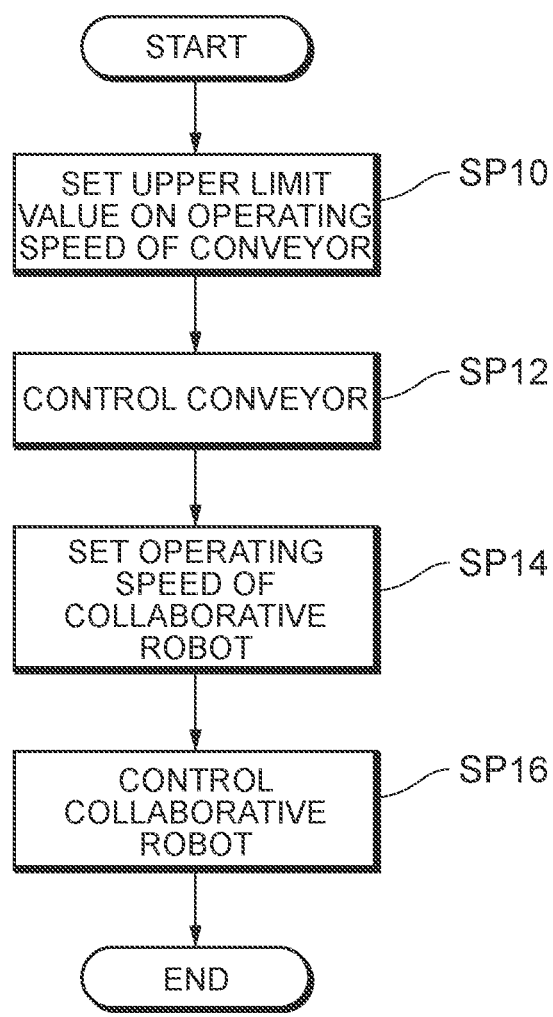
FIG. 2 is a flowchart illustrating an example of the flow of a processing sequence by the robot control system in FIG. 1.

As above, the configuration of the robot control system 1A has been described. Next, the flow of a processing sequence by the robot control system 1A will be described in detail. FIG. 2 is a flowchart illustrating an example of the flow of a processing sequence by the robot control system 1A in FIG. 1.

(Step SP10)

The robot control apparatus 10A uses the speed setter 12A to set an upper limit value on the operating speed of the conveyor 30 according to a detection result from the detection device 40. Specifically, on one hand, if the detection result indicates the collaborative state, the robot control apparatus 10A uses the speed setter 12A to set the upper limit value on the operating speed of the conveyor 30 to the first speed. On the other hand, if the detection result indicates the non-collaborative state, the robot control apparatus 10A uses the speed setter 12A to set the upper limit value on the operating speed of the conveyor 30 to the second speed that is a faster value than the first speed. Thereafter, the process proceeds to the process in step SP12.

(Step SP12)

The robot control apparatus 10A uses the conveyor controller 13 to set the operating speed of the conveyor 30 to be less than or equal to the upper limit value on the operating speed of the conveyor 30 set by the speed setter 12A. Next, the robot control apparatus 10A uses the conveyor controller 13 to control operations of the conveyor 30 so as to operate at the operating speed set by the conveyor controller 13. Thereafter, the process proceeds to the process in step SP14.

(Step SP14)

If the detection result outputted from the detection device 40 indicates the collaborative state, the robot control apparatus 10A uses the robot controller 14A to set the operating speed of the collaborative robot 20 to the speed α, for example. Also, if the detection result outputted from the detection device 40 indicates the non-collaborative state, the robot control apparatus 10A uses the robot controller 14A to set the operating speed of the collaborative robot 20 to a speed β that is a faster value than the speed α, for example. Thereafter, the process proceeds to the process in step SP16.

(Step SP16)

The robot control apparatus 10A uses the robot controller 14A to control operations of the collaborative robot 20 at the set operating speed. Thereafter, the processing sequence illustrated in FIG. 3 ends.

<Effects>

As above, in the first embodiment, the robot control apparatus 10A sets an upper limit value on the operating speed of the conveyor 30 according to information related to whether the human 60 detected by the detection device 40 is present within a certain range from the collaborative robot 20, controls operations of the conveyor 30 so that an operating speed less than or equal to the set upper limit value is reached, and controls operations of the collaborative robot 20. Consequently, if the human 60 is not present within the certain range from the collaborative robot 20, the robot control apparatus 10A controls operations of the conveyor 30 without lowering the operating speed of the conveyor 30, and thus can lessen a lowering in the work efficiency of the collaborative robot 20.

Also, in the first embodiment, the robot control apparatus 10A sets the operating speed of the collaborative robot 20 according to information related to the operating speed of the conveyor 30 relayed from the conveyor 30, and controls operations of the collaborative robot 20 so that the set operating speed is reached. Consequently, the robot control apparatus 10A controls operations of the collaborative robot 20 to keep up with the operating speed of the conveyor 30.

Second Embodiment

Next, a second embodiment will be described. Note that in the second embodiment indicated below, portions of the configuration that are the same as the first embodiment are denoted with similar signs, and a description of such portions is omitted.

<Configuration>

Figure 3:
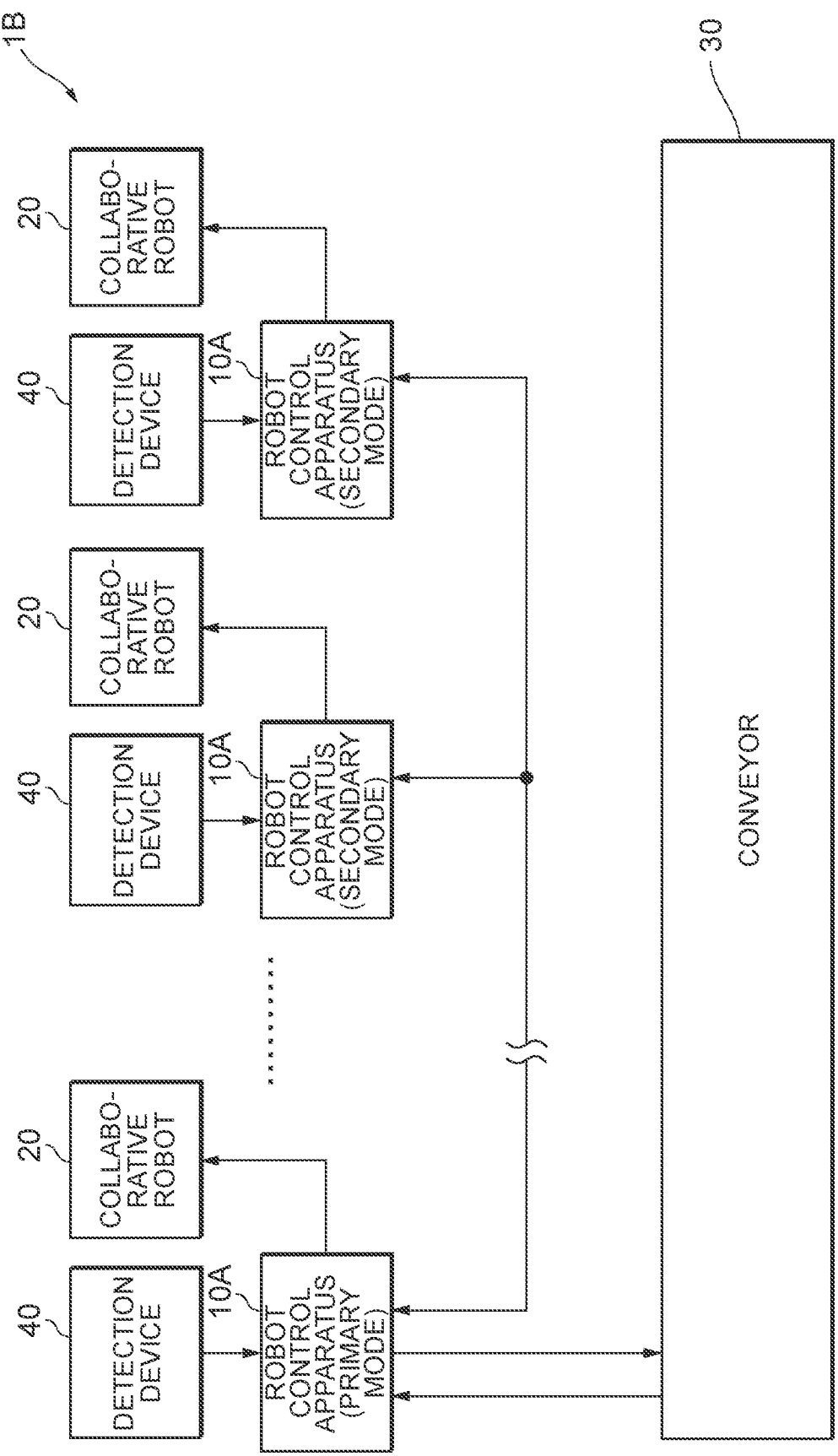
FIG. 3 is a diagram illustrating a configuration of a robot control system according to a second embodiment.

FIG. 3 is a diagram illustrating a configuration of a robot control system 1B according to the second embodiment.

As illustrated in FIG. 3, the robot control system 1B is configuring to mainly include one conveyor 30, one robot control apparatus 10A which is in the primary mode in terms of the control mode, one or more robot control apparatuses 10A which is in the secondary mode in terms of the control mode, and a plurality of collaborative robots 20 and detection devices 40 provided for each of the robot control apparatuses 10A.

In the second embodiment, the robot control apparatus 10A operates in the two control modes of the primary mode and the secondary mode. First, FIG. 1 will be referenced to describe operations of the conveyor controller 13 and the robot controller 14A in the second embodiment.

The conveyor controller 13 sets the operating speed of the conveyor 30 according to the control mode relayed from the mode setter 11, and controls operations of the conveyor 30 or stops the control of operations of the conveyor 30 so that the set operating speed is reached.

First, operations of the conveyor controller 13 in the case in which the control mode is the primary mode will be described. The conveyor controller 13 receives, through a terminal L, information related to the upper limit value on the operating speed of the conveyor 30 from another robot control apparatus 10A which is in the secondary mode in terms of the control mode. The conveyor controller 13 selects either the upper limit value on the operating speed of the conveyor 30 relayed from the speed setter 12A or the received upper limit value on the operating speed of the conveyor 30, whichever is the smaller value, and sets the operating speed of the conveyor 30 to be an operating speed that is less than or equal to the selected upper limit value. The conveyor controller 13 controls operations of the conveyor 30 so that the set operating speed is reached. Furthermore, the conveyor controller 13 transmits the set operating speed of the conveyor 30 to the other robot control apparatus 10A which is in the secondary mode in terms of the control mode.

Next, operations of the conveyor controller 13 in the case in which the control mode is the secondary mode will be described. The conveyor controller 13 stops the control of operations of the conveyor 30. Also, the conveyor controller 13 transmits the upper limit value on the operating speed of the conveyor 30 relayed from the speed setter 12A to the other robot control apparatus 10A which is in the primary mode in terms of the control mode.

The robot controller 14A sets the operating speed of the collaborative robot 20 according to the control mode relayed from the mode setter 11, and controls operations of the collaborative robot 20 so that the set operating speed is reached.

Operations of the robot controller 14A in the case in which the control mode is the primary mode are similar to the first embodiment, and therefore a description is omitted. Operations of the robot controller 14A in the case in which the control mode is the secondary mode will be described. The robot controller 14A calculates and sets an operating speed for the collaborative robot 20 that can keep up, in accordance with the operating speed of the conveyor 30 relayed through the terminal L from the other robot control apparatus 10A which is in the primary mode in terms of the control mode. Additionally, the robot controller 14A controls the operating speed of the collaborative robot 20 so that the set operating speed is reached.

Returning to FIG. 3, in the second embodiment, the conveyor 30 is connected to the robot control apparatus 10A in the primary mode, and transmits/receives signals with respect to the robot control apparatus 10A. Also, each robot control apparatus 10A is connected to a corresponding detection device 40 and collaborative robot 20. Furthermore, the robot control apparatuses 10A are interconnected through the terminal L, and transmit/receive signals with each other.

First, the robot control apparatus 10A in the secondary mode uses the speed setter 12A to set an upper limit value on the operating speed of the conveyor 30 according to a detection result from the detection device 40. Additionally, the robot control apparatus 10A in the secondary mode transmits the upper limit value on the operating speed of the conveyor 30 set using the speed setter 12A to the robot control apparatus 10A in the primary mode. Note that the robot control apparatus 10A in the secondary mode stops the control of operations of the conveyor 30.

Also, the robot control apparatus 10A in the primary mode uses the speed setter 12A to calculate an upper limit value on the operating speed of the conveyor 30 according to a detection result from the detection device 40. Next, the robot control apparatus 10A in the primary mode selects either the upper limit value on the operating speed of the conveyor 30 calculated by the speed setter 12A or the upper limit value on the operating speed of the conveyor 30 transmitted from the robot control apparatus 10A in the secondary mode, whichever is smaller. Furthermore, the robot control apparatus 10A in the primary mode sets the operating speed of the conveyor 30 to be an operating speed less than or equal to the selected upper limit value. Thereafter, the robot control apparatus 10A in the primary mode transmits the operating speed of the conveyor 30 to the other robot control apparatus 10A which is in the secondary mode in terms of the control mode, and controls operations of the conveyor 30 so that the set operating speed is reached. Also, the robot control apparatus 10A in the primary mode uses the robot controller 14A to set the operating speed of the collaborative robot 20 so as to keep up with the set operating speed of the conveyor 30, and controls the collaborative robot 20 so that the set operating speed is reached.

Next, the robot control apparatus 10A in the secondary mode receives information related to the operating speed of the conveyor 30 from the robot control apparatus 10A in the primary mode, uses the robot controller 14A to set a corresponding operating speed of the collaborative robot 20 to keep up with the received operating speed of the conveyor 30, and controls operations of the collaborative robot 20 so that the set operating speed is reached.

<Effects>

As above, in the second embodiment, the robot control system 1B is configuring to include a single conveyor 30, a plurality of robot control apparatuses 10A, and a collaborative robot 20 and detection device 40 corresponding to each of the robot control apparatuses 10A. Also, the robot control apparatus 10A uses the mode setter 11 to set the control mode to either the primary mode (first mode) or the secondary mode (second mode). Furthermore, the robot control system 1B sets an upper limit value on the operating speed of the conveyor 30 in accordance with the smallest value among the upper limit values on the operating speed of the conveyor 30 set by each of the robot control apparatuses 10A, and controls operations of the conveyor 30 so that an operating speed less than or equal to the set upper limit value is reached.

Accordingly, even in the case in which a plurality of collaborative robots 20, robot control apparatuses 10A, and detection devices 40 are associated with a single conveyor 30, the robot control system 1B sets the operating speed of the conveyor 30 according to whether the human 60 is present within a certain range from the collaborative robots 20, and thus can lessen a lowering in the work efficiency of the collaborative robots 20.

Third Embodiment

Next, a third embodiment will be described. Note that in the third embodiment indicated below, portions of the configuration that are the same as the first embodiment are denoted with similar signs, and a description of such portions is omitted.

Figure 4:
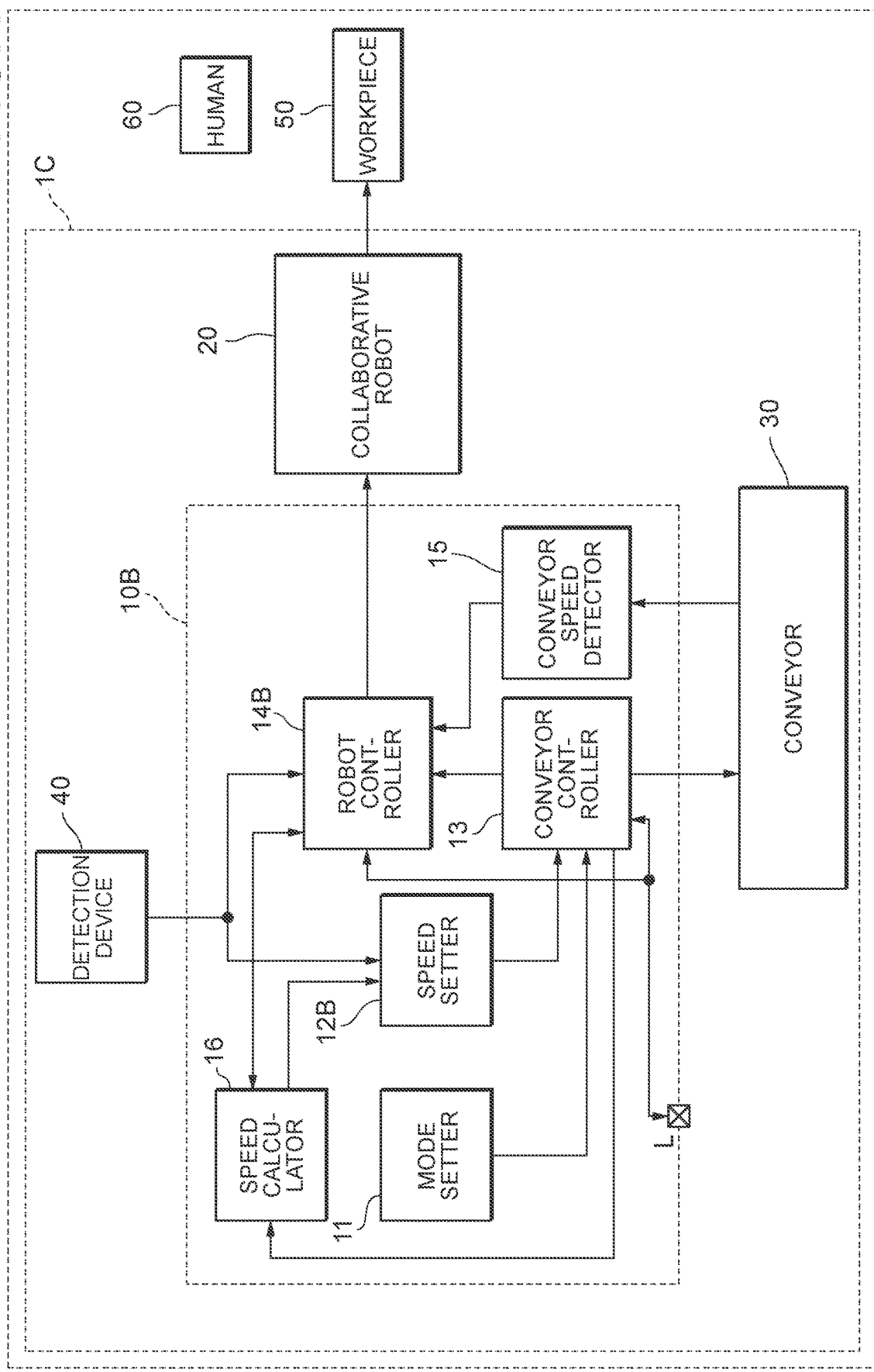
FIG. 4 is a diagram illustrating a configuration of a robot control system according to a third embodiment.

FIG. 4 is a diagram illustrating a configuration of a robot control system 1C according to the third embodiment. As illustrated in FIG. 4, the robot control system 1C is configuring to include a robot control apparatus 10B instead of the robot control apparatus 10A as compared to the robot control system 1A. Moreover, the robot control apparatus 10B is configuring to further include a speed calculator 16 as compared to the robot control apparatus 10A.

The speed calculator 16 calculates the operating speed of the collaborative robot 20 according to the content of operations of the collaborative robot 20 stored in advance in the robot control apparatus 10B and the operating speed of the conveyor 30 set by the conveyor controller 13. The speed calculator 16 relays the calculated operating speed of the collaborative robot 20 to a robot controller 14B.

The speed calculator 16 also determines whether the calculated operating speed of the collaborative robot 20 exceeds an upper limit value (third speed or fourth speed) relayed from a speed setter 12B. In the case of determining that the calculated operating speed of the collaborative robot 20 exceeds the upper limit value, the speed calculator 16 calculates the operating speed of the conveyor 30 so that the operating speed of the collaborative robot 20 is the upper limit value. The speed calculator 16 relays the calculated operating speed of the conveyor 30 to the speed setter 12B.

The speed setter 12B further includes the function described next, in addition to the functions of the speed setter 12A. The speed setter 12B sets an upper limit value on the operating speed of the collaborative robot 20 such that the value is different depending on the detection result outputted from the detection device 40, and relays the set upper limit value on the operating speed of the collaborative robot 20 to the speed calculator 16. Specifically, on one hand, if the detection result from the detection device 40 indicates the collaborative state, the speed setter 12B sets the upper limit value on the operating speed of the collaborative robot 20 to a third speed. On the other hand, if the detection result from the detection device 40 indicates the non-collaborative state, the speed setter 12B sets the upper limit value on the operating speed of the collaborative robot 20 to a fourth speed that is a faster value than the third speed.

Also, if the operating speed of the conveyor 30 is relayed from the speed calculator 16, the speed setter 12B sets the relayed operating speed as the upper limit value on the operating speed of the conveyor 30, and relays the set upper limit value on the operating speed of the conveyor 30 to the conveyor controller 13.

The robot controller 14B further includes the function described next, in addition to the functions of the robot controller 14A. If the operating speed of the collaborative robot 20 is relayed from the speed calculator 16, the robot controller 14B sets the operating speed of the collaborative robot 20 to the relayed operating speed.

Figure 5:
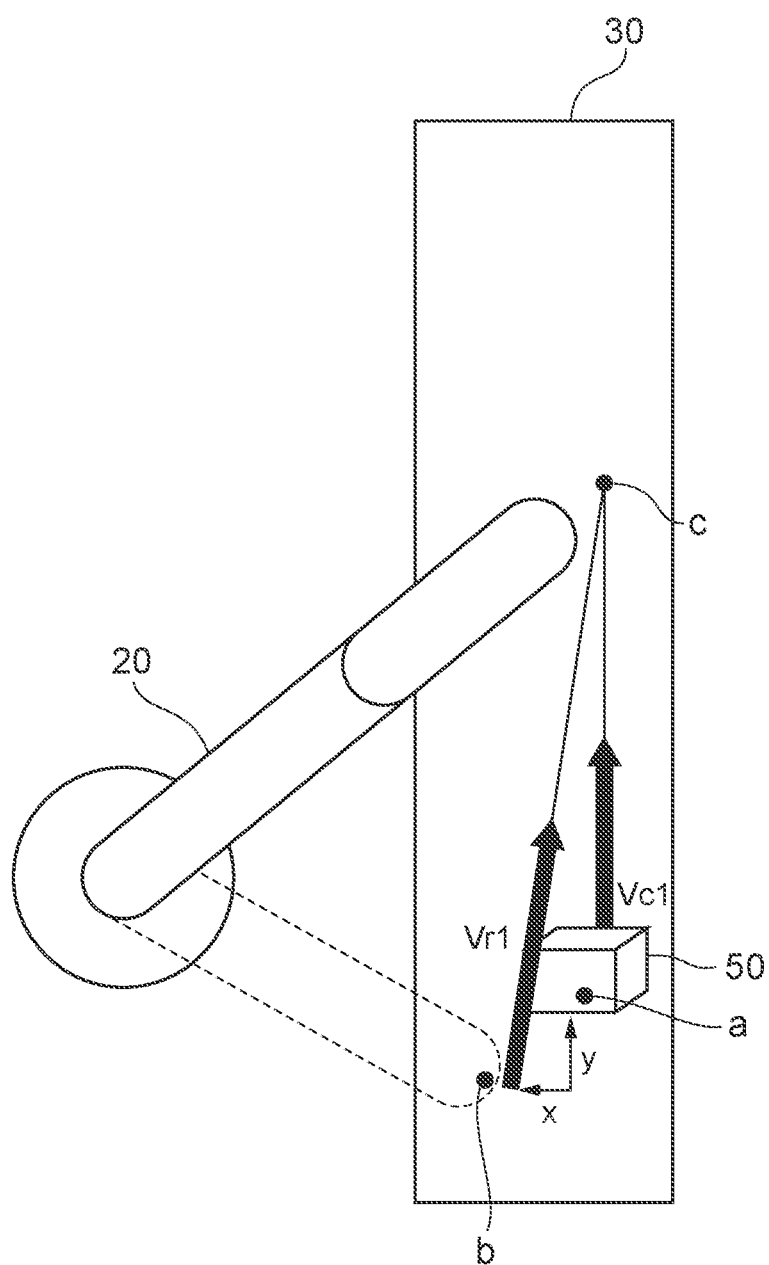
FIG. 5 is a diagram illustrating operations of a collaborative robot and a conveyor in the case in which the robot control system in FIG. 4 is in a non-collaborative state.
Figure 6:
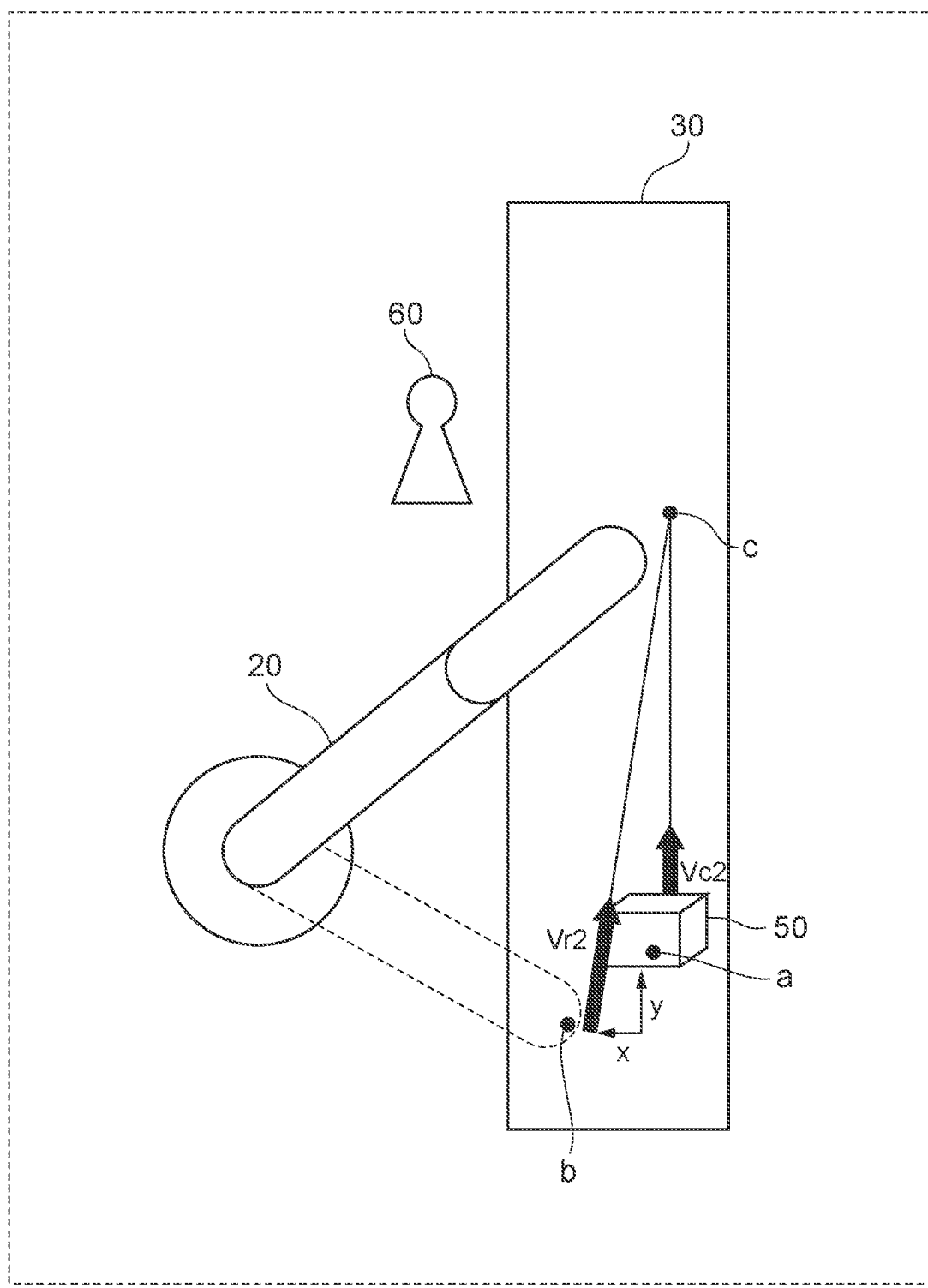
FIG. 6 is a diagram illustrating operations of a collaborative robot and a conveyor in the case in which the robot control system in FIG. 4 is in a collaborative state.

Next, operations of the collaborative robot 20 according to the speed calculator 16 will be described. FIG. 5A is a diagram illustrating operations of the collaborative robot 20 and the conveyor 30 in the case in which the robot control system 1C in FIG. 4 is in the non-collaborative state. Also, FIG. 5B is a diagram illustrating operations of the collaborative robot 20 and the conveyor 30 in the case in which the robot control system 1C in FIG. 4 is in the collaborative state.

As illustrated in FIG. 5A, the workpiece 50 is placed at a point a on the conveyor 30. Also, an arm of the collaborative robot 20 is located at a point b at a distance y from the point a in the direction opposite to the movement direction of the conveyor 30 and a distance x from the point a in the direction perpendicular to the movement direction of the conveyor 30 and toward the collaborative robot 20.

Also, in the non-collaborative state, the conveyor 30 operates at an operating speed vc1. Furthermore, the workpiece 50 moves on the conveyor 30 at the operating speed vc1.

In the non-collaborative state, the collaborative robot 20 moves its arm from the point b to a point c a certain distance away from the point a in the movement direction of the conveyor 30, and performs prescribed processing work on the workpiece 50. In the present embodiment, the content of operations of the collaborative robot 20 is a linear movement from a start point (point b) to an end point (point c), for example.

In this case, the speed calculator 16 calculates an operating speed vr1 for moving the arm from the point a to the point c with the collaborative robot 20 in the non-collaborative state according to the operating speed vc1 of the conveyor 30 in the non-collaborative state, the distance between the point a and the point c, and the distance between the point b and the point c.

Also, if the operating speed vr1 exceeds the fourth speed, that is, the upper limit value on the operating speed of the collaborative robot 20 in the non-collaborative state, the speed calculator 16 calculates an upper limit value on the operating speed of the conveyor 30 in the non-collaborative state according to the fourth speed, the distance between the point a and the point c, and the distance between the point b and the point c.

Referring to FIG. 5B, in the collaborative state, the conveyor 30 operates at an operating speed vc2. Furthermore, the workpiece 50 moves on the conveyor 30 at the operating speed vc2.

In the collaborative state, similarly to the non-collaborative state, the collaborative robot 20 moves its arm from the point b to a point c a certain distance away from the point a in the movement direction of the conveyor 30, and performs prescribed processing work on the workpiece 50.

In this case, the speed calculator 16 calculates an operating speed vr2 for moving the arm from the point a to the point c with the collaborative robot 20 in the collaborative state according to the operating speed vc2 of the conveyor 30 in the collaborative state, the distance between the point a and the point c, and the distance between the point b and the point c.

Also, if the operating speed vr2 exceeds the third speed, that is, the upper limit value on the operating speed of the collaborative robot 20 in the collaborative state, the speed calculator 16 calculates an upper limit value on the operating speed of the conveyor 30 in the non-collaborative state according to the third speed, the distance between the point a and the point c, and the distance between the point b and the point c.

<Effects>

As above in the third embodiment, if the operating speed of the collaborative robot 20 calculated according to the operating speed of the conveyor 30 and the operation content of the collaborative robot 20 exceeds the upper limit value, the robot control system 1C calculates and sets the operating speed of the conveyor 30 so that the upper limit value on the operating speed of the collaborative robot 20 is not exceeded.

Consequently, the robot control system 1C sets the operating speed of the conveyor 30 not only according to whether the human 60 is present within a certain range from the collaborative robot 20 but also according to the operation content of the collaborative robot 20, and thus can lessen a lowering in the work efficiency of the collaborative robot 20.

—Modifications—

Note that the present invention is not limited to the above embodiments. That is, even if a person skilled in the art applies design changes, as appropriate, to the above embodiments, the resulting embodiments are also included in the scope of the present invention insofar as the features of the present invention are provided. In addition, the elements provided in the above embodiments and the modifications described below can be combined to the extent technically possible, and such combinations of elements are also included in the scope of the present invention insofar as the features of the present invention are included.

For example, the second embodiment describes a case in which a plurality of collaborative robots 20, detection devices 40, and robot control apparatuses 10A are associated with a single conveyor 30, but is not limited thereto. For example, a plurality of collaborative robots 20, detection devices 40, and robot control apparatuses 10A may also be associated with a plurality of conveyors 30. In this case, several of the collaborative robots 20 are assumed to perform work such as moving the workpiece 50 from one conveyor 30 to another conveyor 30, for example. In such a robot control system 1B, similarly to the second embodiment, the robot control apparatus 10A in the primary mode collectively sets the operating speed of the one conveyor 30 and the other conveyor 30, transmits the set operating speed to the robot control apparatus 10A in the secondary mode, and controls the operating speed of the one conveyor 30 and the other conveyor 30 so that the set operating speed is reached.

According to this configuration, even in the case in which a plurality of robot control apparatus 10A, collaborative robots 20, and detection devices 40 are associated with a plurality of conveyors 30, the robot control system 1B sets the operating speed of the conveyors 30 according to whether the human 60 is present within a certain range from the collaborative robots 20, and thus can lessen a lowering in the work efficiency of the collaborative robots 20.

What is claimed is:

1. A robot control apparatus that controls operations of a collaborative robot that processes a workpiece flowing on a conveyor, wherein a base of the collaborative robot is independent of the conveyor, the control being performed according to a detection result from a detection device that detects a human present within a certain range from the collaborative robot, the robot control apparatus comprising: a speed setter configured to set an upper limit value on an operating speed of the conveyor such that the value is different depending on whether a human is or is not detected from the detection result from the detection device; and a conveyor controller configured to control the operating speed of the conveyor to be an operating speed less than or equal to the upper limit value set by the speed setter.

2. The robot control apparatus according to claim 1, wherein if the detection result from the detection device indicates that a human is present within the certain range from the collaborative robot, the speed setter is configured to set the upper limit value to a first speed, and if the detection result from the detection device indicates that a human is not present within the certain range from the collaborative robot, the speed setter is configured to set the upper limit value to a second speed that is faster than the first speed.

3. The robot control apparatus according to claim 1, further comprising: a conveyor speed detector configured to detect the operating speed of the conveyor; and a robot controller configured to set an operating speed of the collaborative robot according to the detection result from the detection device and a detection result from the conveyor speed detector.

4. The robot control apparatus according to claim 2, further comprising: a conveyor speed detector configured to detect the operating speed of the conveyor; and a robot controller configured to set an operating speed of the collaborative robot according to the detection result from the detection device and a detection result from the conveyor speed detector.

5. The robot control apparatus according to claim 1, wherein the speed setter is additionally configured to set an upper limit value on an operating speed of the collaborative robot, the robot control apparatus further comprises: a speed calculator configured to calculate an operating speed of the collaborative robot according to the operating speed of the conveyor controlled by the conveyor controller and operation content of the collaborative robot stored in advance, and if the calculated operating speed of the collaborative robot exceeds the upper limit value on the operating speed of the collaborative robot set by the speed setter, calculates the operating speed of the conveyor so that the operating speed of the collaborative robot is the upper limit value on the operating speed of the collaborative robot; and a robot controller configured to set the operating speed of the collaborative robot to the operating speed of the collaborative robot calculated by the speed calculator, and the operating speed of the conveyor calculated by the speed calculator is set as the upper limit value on the operating speed of the conveyor.

6. A robot control system comprising: a conveyor; a collaborative robot that processes a workpiece flowing on the conveyor, wherein a base of the collaborative robot is independent of the conveyor; a detection device that detects a human present within a certain range from the collaborative robot; and a robot control apparatus including a speed setter configured to set an upper limit value on an operating speed of the conveyor such that the value is different depending on whether a human is or is not detected from a detection result from the detection device, a conveyor controller configured to control the operating speed of the conveyor to be an operating speed less than or equal to the upper limit value set by the speed setter, and a robot controller configured to set an operating speed of the collaborative robot according to the detection result from the detection device.

7. The robot control system according to claim 6, wherein the robot control apparatus is a plurality of robot control apparatuses and at least one of the robot control apparatuses comprises a mode setter configured to set a control mode to either a first mode or a second mode, and the conveyor controller if the control mode is the first mode, the conveyor controller is configured to control operations of the conveyor so that the operating speed is up to the upper limit value which is the smaller value of either the upper limit value set by the speed setter or a transmitted upper limit value set in another robot control apparatus which is in the second mode in terms of the control mode, and if the control mode is the second mode, the conveyor controller is configured to stop control of the conveyor and transmit the upper limit value set by the speed setter to another robot control apparatus.

8. A robot control method for controlling operations of a collaborative robot that processes work on a workpiece flowing on a conveyor, wherein a base of the collaborative robot is independent of the conveyor, the control being performed according to a detection result from a detection device that detects a human present within a certain range from the collaborative robot, the robot control method comprising: setting an upper limit value on an operating speed of the conveyor such that the value is different depending on whether a human is or is not detected from the detection result from the detection device; controlling operations of the conveyor at an operating speed up to the set upper limit value; setting an operating speed of the collaborative robot according to the detection result from the detection device; and controlling operations of the collaborative robot so that the set operating speed is reached.

9. The robot control method according to claim 8, wherein when the detection result from the detection device indicates that a human is present within the certain range from the collaborative robot, setting the upper limit value to a first speed, and when the detection result from the detection device indicates that a human is not present within the certain range from the collaborative robot, setting the upper limit value to a second speed that is faster than the first speed.

10. The robot control method according to claim 8, further comprising: detecting the operating speed of the conveyor; and setting an operating speed of the collaborative robot according to the detection result from the detection device and the detected operating speed of the conveyor.

11. The robot control method according to claim 9, further comprising: detecting the operating speed of the conveyor; and setting an operating speed of the collaborative robot according to the detection result from the detection device and the detected operating speed of the conveyor.

12. The robot control method according to claim 8, further comprising setting an upper limit value on an operating speed of the collaborative robot when a human is not detected from the detection result, calculating an operating speed of the collaborative robot according to the operating speed of the conveyor and stored operation content of the collaborative robot, and when the calculated operating speed of the collaborative robot exceeds the upper limit value of the operating speed of the collaborative robot, calculating the operating speed of the conveyor so that the operating speed of the collaborative robot is the upper limit value of the operating speed of the collaborative robot; and setting the operating speed of the collaborative robot to the calculated operating speed of the collaborative robot, and setting the upper limit value of the operating speed of the conveyor as the calculated operating speed of the conveyor.

13. The robot control method according to claim 12, further comprising: setting a control mode to either a first mode or a second mode, and when the control mode is the first mode, controlling operations of the conveyor so that the operating speed is up to the upper limit value which is the smaller value of either the upper limit value set or a transmitted upper limit value set in at least one second collaborative robot which is in the second mode, and when the control mode is the second mode, stopping control of the conveyor and transmitting the upper limit value to another robot control apparatus.

* * * * *